(12) United States Patent
Dybsetter et al.

(10) Patent No.: US 8,267,600 B2
(45) Date of Patent: Sep. 18, 2012

(54) EARLY SELF-VALIDATION OF PERSISTENT MEMORY DURING BOOT IN AN OPTICAL TRANSCEIVER

(75) Inventors: Gerald L. Dybsetter, Scotts Valley, CA (US); Jayne C. Hahin, Cupertino, CA (US)

(73) Assignee: Finisar Corporation, Sunnyvale, CA (US)

( * ) Notice: Subject to any disclaimer, the term of this patent is extended or adjusted under 35 U.S.C. 154(b) by 157 days.

(21) Appl. No.: 12/817,091

(22) Filed: Jun. 16, 2010

(65) Prior Publication Data

US 2010/0254710 A1  Oct. 7, 2010

Related U.S. Application Data

(62) Division of application No. 11/228,543, filed on Sep. 16, 2005, now Pat. No. 7,744,291.

(60) Provisional application No. 60/623,368, filed on Oct. 29, 2004.

(51) Int. Cl.
*G02B 6/36* (2006.01)
(52) U.S. Cl. ............ 385/92; 398/135; 398/138
(58) Field of Classification Search ............ 385/88–94; 398/135–139; 713/1, 2
See application file for complete search history.

(56) References Cited

U.S. PATENT DOCUMENTS

| | | | |
|---|---|---|---|
| 6,807,630 B2 * | 10/2004 | Lay et al. | 713/2 |
| 6,854,054 B1 * | 2/2005 | Kavanagh | 713/2 |
| 7,522,840 B2 * | 4/2009 | Dybsetter et al. | 398/135 |
| 7,533,254 B2 * | 5/2009 | Dybsetter et al. | 713/2 |
| 7,744,291 B2 * | 6/2010 | Dybsetter et al. | 385/92 |
| 2004/0022537 A1 * | 2/2004 | Mecherle et al. | 398/41 |

* cited by examiner

*Primary Examiner* — Daniel Petkovsek
(74) *Attorney, Agent, or Firm* — Maschoff Gilmore & Israelsen

(57) ABSTRACT

An operational optical transceiver configured to self-validate a boot image loaded from the persistent memory early in the boot process. The optical transceiver includes a persistent memory, a controller, and a system memory. The controller initializes the boot process and begins to load information from the persistent memory to the system memory. Next, the controller detects early in the boot process boot image verification data in the information being sent to the system memory. The controller then determines if the boot image verification data has an expected value. If the verification data includes the expected value, the controller continues the boot process. If the verification data does not include the expected value, the controller will retry the boot process a predetermined number of times and will enter a default operational state if the expected value is not detected while retrying the boot process the predetermined number of times.

10 Claims, 2 Drawing Sheets

EARLY SELF-VALIDATION OF PERSISTENT MEMORY DURING BOOT IN AN OPTICAL TRANSCEIVER

CROSS-REFERENCE TO RELATED APPLICATIONS

This application is a divisional of, and claims priority to, U.S. application Ser. No. 11/228,543, filed on Sep. 16, 2005, entitled "EARLY SELF-VALIDATION OF PERSISTENT MEMORY DURING BOOT IN AN OPTICAL TRANSCEIVER," which issued as U.S. Pat. No. 7,744,291, which claims the benefit of U.S. Provisional Application No. 60/623,368, filed Oct. 29, 2004, which is incorporated herein by reference in its entirety.

BACKGROUND OF THE INVENTION

1. The Field of the Invention

The present invention relates generally to optical transceivers. More specifically, the present invention relates to self-validation of persistent memory in an optical transceiver.

2. The Relevant Technology

Computing and networking technology have transformed our world. As the amount of information communicated over networks has increased, high speed transmission has become ever more critical. Many high speed data transmission networks rely on optical transceivers and similar devices for facilitating transmission and reception of digital data embodied in the form of optical signals over optical fibers. Optical networks are thus found in a wide variety of high speed applications ranging from as modest as a small Local Area Network (LAN) to as grandiose as the backbone of the Internet.

Typically, data transmission in such networks is implemented by way of an optical transmitter (also referred to as an electro-optic transducer), such as a laser or Light Emitting Diode (LED). The electro-optic transducer emits light when current is passed there through, the intensity of the emitted light being a function of the current magnitude. Data reception is generally implemented by way of an optical receiver (also referred to as an optoelectronic transducer), an example of which is a photodiode. The optoelectronic transducer receives light and generates a current, the magnitude of the generated current being a function of the intensity of the received light.

Various other components are also employed by the optical transceiver to aid in the control of the optical transmit and receive components, as well as the processing of various data and other signals. For example, such optical transceivers typically include a driver (e.g., referred to as a "laser driver" when used to drive a laser signal) configured to control the operation of the optical transmitter in response to various control inputs. The optical transceiver also generally includes an amplifier (e.g., often referred to as a "post-amplifier") configured to perform various operations with respect to certain parameters of a data signal received by the optical receiver. A controller circuit (hereinafter referred to the "controller") controls the operation of the laser driver and post amplifier. What would be advantageous is to improve the efficiency of such a controller when operating to control the various features of the optical transceiver.

BRIEF SUMMARY OF THE INVENTION

The forgoing problems with the prior state of the art are overcome by the principles of the present invention, which relate to an optical transceiver configured to self-validate a boot image early in the boot process. The optical transceiver includes a persistent memory, a controller, and a system memory. During the boot process, the optical transceiver loads information from persistent memory to the system memory.

The controller initiates the boot process and begins to load information such as microcode from the persistent memory to the system memory. As the information is being loaded, the controller early in the boot process detects boot image verification data contained in the information. The boot image verification data is configured such that it should contain an expected value if the boot image is not corrupt.

As a result of detecting the speed data, the controller determines whether the boot verification data has the expected value. If the controller determines that the verification data has the expected value, then the boot process is continued as the boot image is most likely correct. On the other hand, if the controller determines that the verification value does not have the expected value, then the controller will retry the boot process a predetermined number of times. If the verification data does not have the expected value after retrying the boot process the predetermined number of times, the controller will enter a default operational state so that it becomes accessible to a host computing system for error analysis.

Accordingly, the boot image is verified early in the boot process. Early verification of the boot image helps to ensure that correct data is loaded. For example, if the boot image is incorrect, then the I/O pins of the optical transceiver may be improperly configured. This may cause the host interface to become inoperable. Other components of the optical transceiver may also not function properly. In addition, if the persistent memory has not yet been programmed with a correct boot image, then the transceiver may not boot at all. Early validation of the boot image helps to prevent these problems.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

The principles of the present invention relate to an operational optical transceiver configured to self-validate a boot image loaded from the persistent memory early in the boot process. The optical transceiver includes a persistent memory, a controller, and a system memory. The controller initializes the boot process and begins to load information from the persistent memory to the system memory. Next, the controller detects early in the boot process boot image verification data in the information being sent to the system memory. The controller then determines if the boot image verification data has an expected value. If the verification data includes the expected value, the controller continues the boot process. If the verification data does not include the expected value, the controller will retry the boot process a predetermined number of times. If the verification data does not have the expected value after retrying the boot process the predetermined number of times, the controller will enter a default operational state so that it becomes accessible to a host computing system for error analysis. An example operational optical transceiver environment will first be described. Then, the operation in accordance with the invention will be described with respect to the operational environment.

Figure 1:
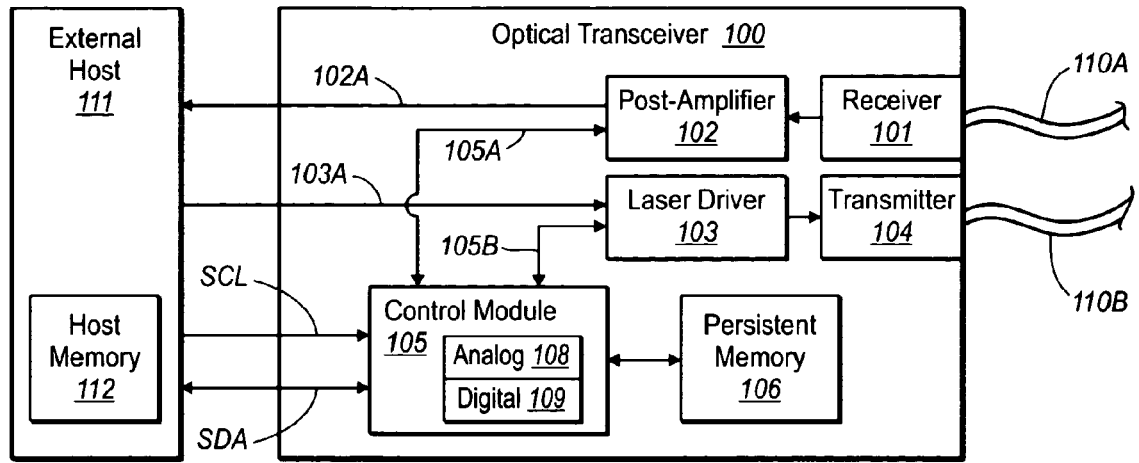
FIG. 1 schematically illustrates an example of an optical transceiver that may implement features of the present invention.

FIG. 1 illustrates an optical transceiver 100 in which the principles of the present invention may be employed. While the optical transceiver 100 will be described in some detail, the optical transceiver 100 is described by way of illustration only, and not by way of restricting the scope of the invention. The principles of the present invention are suitable for 1G, 2G, 4G, 8G, 10G and higher bandwidth fiber optic links Furthermore, the principles of the present invention may be implemented in optical (e.g., laser) transmitter/receivers of any form factor such as XFP, SFP and SFF, without restriction. Having said this, the principles of the present invention are not limited to an optical transceiver environment at all.

The optical transceiver 100 receives an optical signal from fiber 110A using receiver 101. The receiver 101 acts as an opto-electric transducer by transforming the optical signal into an electrical signal. The receiver 101 provides the resulting electrical signal to a post-amplifier 102. The post-amplifier 102 amplifies the signal and provides the amplified signal to an external host 111 as represented by arrow 102A. The external host 111 may be any computing system capable of communicating with the optical transceiver 100. The external host 111 may contain a host memory 112 that may be a volatile or non-volatile memory source. In one embodiment, the optical transceiver 100 may be a printed circuit board or other components/chips within the host 111, although this is not required.

The optical transceiver 100 may also receive electrical signals from the host 111 for transmission onto the fiber 110B. Specifically, the laser driver 103 receives the electrical signal as represented by the arrow 103A, and drives the transmitter 104 (e.g., a laser or Light Emitting Diode (LED)) with signals that cause the transmitter 104 to emit onto the fiber 110B optical signals representative of the information in the electrical signal provided by the host 111. Accordingly, the transmitter 104 serves as an electro-optic transducer.

The behavior of the receiver 101, the post-amplifier 102, the laser driver 103, and the transmitter 104 may vary dynamically due to a number of factors. For example, temperature changes, power fluctuations, and feedback conditions may each affect the performance of these components. Accordingly, the optical transceiver 100 includes a control module 105, which may evaluate temperature and voltage conditions and other operational circumstances, and receive information from the post-amplifier 102 (as represented by arrow 105A) and from the laser driver 103 (as represented by arrow 105B). This allows the control module 105 to optimize the dynamically varying performance, and additionally detect when there is a loss of signal.

Specifically, the control module 105 may counteract these changes by adjusting settings on the post-amplifier 102 and/or the laser driver 103 as also represented by the arrows 105A and 105B. These settings adjustments are quite intermittent since they are only made when temperature or voltage or other low frequency changes so warrant. Receive power is an example of such a low frequency change.

The control module 105 may have access to a persistent memory 106, which in one embodiment, is an Electrically Erasable and Programmable Read Only Memory (EEPROM). The persistent memory 106 and the control module 105 may be packaged together in the same package or in different packages without restriction. Persistent memory 106 may also be any other non-volatile memory source.

Figure 2:
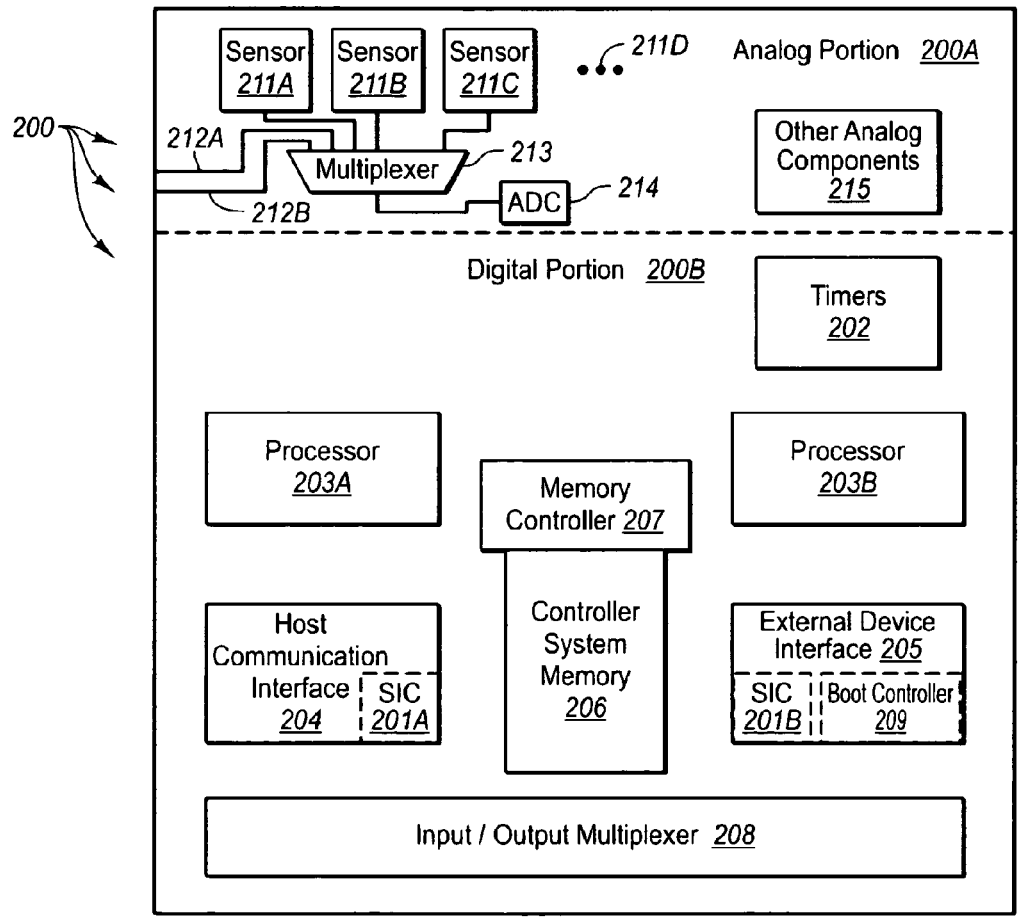
FIG. 2 schematically illustrates an example of a control module of FIG. 1.

The control module 105 includes both an analog portion 108 and a digital portion 109. Together, they allow the control module to implement logic digitally, while still largely interfacing with the rest of the optical transceiver 100 using analog signals. FIG. 2 schematically illustrates an example 200 of the control module 105 in further detail. The control module 200 includes an analog portion 200A that represents an example of the analog portion 108 of FIG. 1, and a digital portion 200B that represents an example of the digital portion 109 of FIG. 1.

For example, the analog portion 200A may contain digital to analog converters, analog to digital converters, high speed comparators (e.g., for event detection), voltage based reset generators, voltage regulators, voltage references, clock generator, and other analog components. For example, the analog portion 200A includes sensors 211A, 211B, 211C amongst potentially others as represented by the horizontal ellipses 211D. Each of these sensors may be responsible for measuring operational parameters that may be measured from the control module 200 such as, for example, supply voltage and transceiver temperature. The control module may also receive external analog or digital signals from other components within the optical transceiver that indicate other measured parameters such as, for example, laser bias current, transmit power, receive power, laser wavelength, laser temperature, and Thermo Electric Cooler (TEC) current. Two external lines 212A and 212B are illustrated for receiving such external analog signals although there may be many of such lines.

The internal sensors may generate analog signals that represent the measured values. In addition, the externally provided signals may also be analog signals. In this case, the analog signals are converted to digital signals so as to be available to the digital portion 200B of the control module 200 for further processing. Of course, each analog parameter value may have its own Analog to Digital Converter (ADC). However, to preserve chip space, each signal may be periodically sampled in a round robin fashion using a single ADC such as the illustrated ADC 214. In this case, each analog value may be provided to a multiplexer 213, which selects in a round robin fashion, one of the analog signals at a time for sampling by the ADC 214. Alternatively, multiplexer 213 may be programmed to allow any order of analog signals to be sampled by ADC 214.

As previously mentioned, the analog portion 200A of the control module 200 may also include other analog components 215 such as, for example, digital to analog converters, other analog to digital converters, high speed comparators (e.g., for event detection), voltage based reset generators, voltage regulators, voltage references, clock generator, and other analog components.

The digital portion 200B of the control module 200 may include a timer module 202 that provides various timing signals used by the digital portion 200B. Such timing signals may include, for example, programmable processor clock signals. The timer module 202 may also act as a watchdog timer.

Two general-purpose processors 203A and 203B are also included. The processors recognize instructions that follow a particular instruction set, and may perform normal general-purpose operation such as shifting, branching, adding, subtracting, multiplying, dividing, Boolean operations, comparison operations, and the like. In one embodiment, the general-purpose processors 203A and 203B are each a 16-bit processor and may be identically structured. The precise structure of the instruction set is not important to the principles of the present invention as the instruction set may be optimized around a particular hardware environment, and as the precise hardware environment is not important to the principles of the present invention.

A host communications interface 204 is used to communicate with the host 111, possibly implemented using a two-wire interface such as I²C shown in FIG. 1 as the serial data (SDA) and serial clock (SCL) lines on the optical transceiver 100. Other host communication interfaces may also be implemented as well. Data may be provided from the control module 105 to the host 111 using this host communications interface to allow for digital diagnostics and readings of temperature levels, transmit/receiver power levels, and the like. The external device interface 205 is used to communicate with, for example, other modules within the optical transceiver 100 such as, for example, the post-amplifier 102, the laser driver 103, or the persistent memory 106.

The internal controller system memory 206 (not to be confused with the external persistent memory 106) may be Random Access Memory (RAM) or non-volatile memory. The memory controller 207 shares access to the controller system memory 206 amongst each of the processors 203A and 203B and with the host communication interface 204 and the external device interface 205. In one embodiment, the host communication interface 204 includes a serial interface controller 201A, and the external device interface 205 includes a serial interface controller 201B. The two serial interface controllers 201A and 201B may communicate using a two-wire interface such as I²C or another interface so long as the interface is recognized by both communicating modules. One serial interface controller (e.g., serial interface controller 201B) is a master component, while the other serial interface controller (e.g., serial interface controller 201A) is a slave component.

An input/output multiplexer 208 multiplexes the various input/output pins of the control module 200 to the various components within the control module 200. This enables different components to dynamically assign pins in accordance with the then-existing operational circumstances of the control module 200. Accordingly, there may be more input\output nodes within the control module 200 than there are pins available on the control module 200, thereby reducing the footprint of the control module 200.

Having described a specific environment with respect to FIGS. 1 and 2, it will be understood that this specific environment is only one of countless architectures in which the principles of the present invention may be employed. As previously stated, the principles of the present invention are not intended to be limited to any particular environment. Accordingly, the principles of the present invention relate to an optical transceiver that may be configured to self-validate the contents of the persistent memory early in the boot process.

Figure 3:
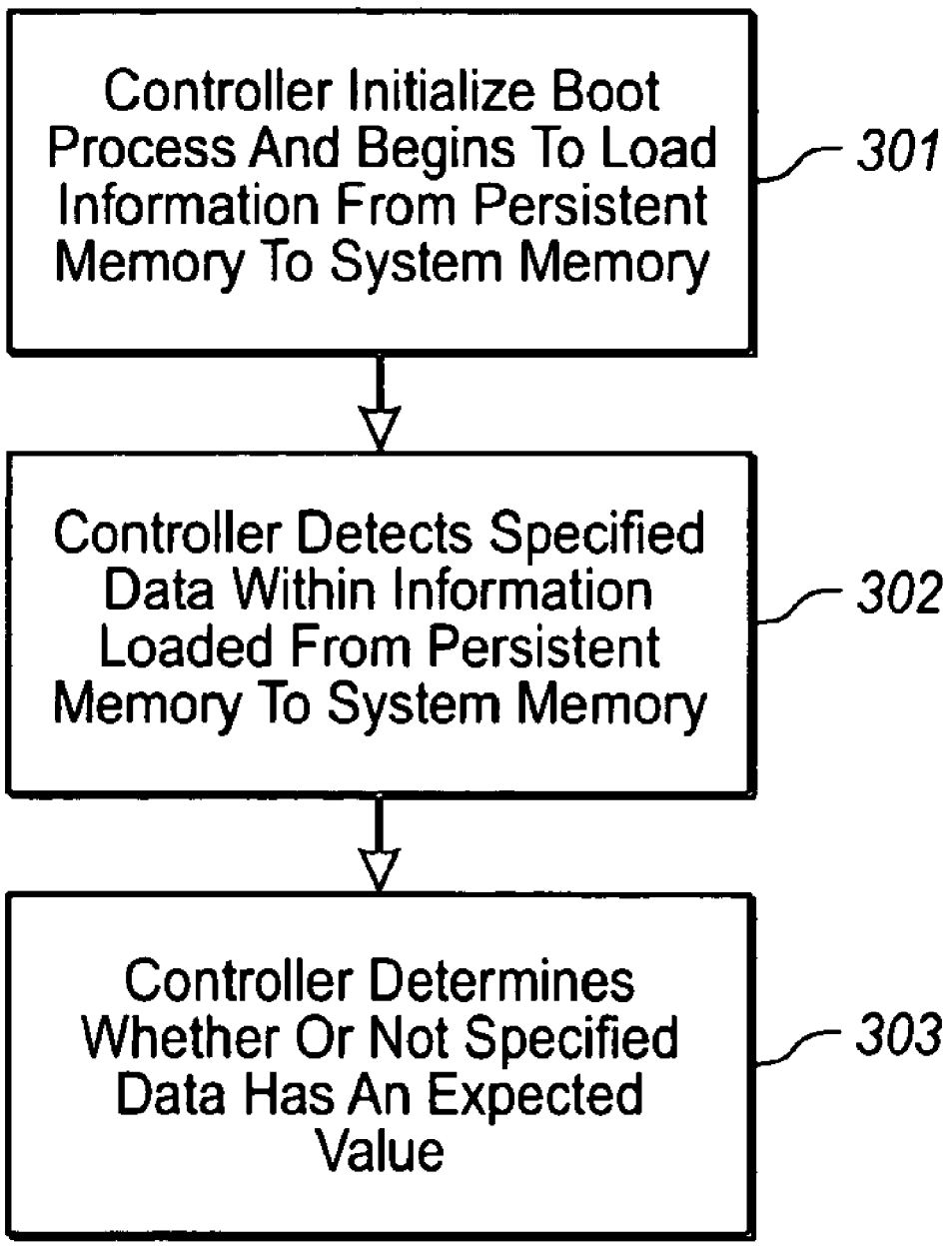
FIG. 3 illustrates a flowchart of a method for an optical transceiver to self-validate a boot image loaded from the persistent memory to the system memory early in the boot process in accordance with the principles of the present invention.

Referring to FIG. 3, a flowchart of a method 300 for an optical transceiver to validate the persistent memory early in the boot process is illustrated. A controller, which may be a boot controller such as boot controller 209 of FIG. 2, a processor such as processors 203 of FIG. 2, or any other device that is capable of initiating a boot process, initializes the boot process, which causes information, which may be microcode, to begin to be loaded from the persistent memory to the system memory (act 301). The controller may initiate a cold boot process when the optical transceiver has been in an off mode for a period of time or the controller may initiate a warm reboot after the optical transceiver has been in operation for a period of time. The persistent memory source may be any non-volatile memory including, but not limited to, an on transceiver persistent memory such as persistent memory 106 of FIG. 2, a host computing system memory such as host memory 112 of FIG. 1, or some remote persistent memory that is connected to the optical transceiver through use of a network such as the internet.

Referring to FIG. 2, external device interface 205 is shown. In addition to the functionality discussed previously, external device interface 205 may also include a boot controller 209 for booting from persistent memory 106. Boot controller 209 may be configured to access (in a register or other storage source) expected data values for comparison with specified boot verification data that is loaded from persistent memory 106 into controller system memory 206 during the boot process. At the start of either a cold or warm boot process, boot controller 209 may begin loading information in the form of microcode from persistent memory 106 to into controller system memory 206.

Referring again to FIG. 3, the controller detects boot specified data within the information loaded from the persistent memory (act 302). This specified data contains boot verification data that is used to verify that the boot image being loaded is valid.

For example, while initializing the boot process, boot controller 209 of FIG. 2 may analyze the microcode being loaded from persistent memory 106 into controller system memory 206. The microcode may be structured to include, among other things, a number of different bytes of data that initialize transceiver 100 hardware during the boot process. The first byte may initialize controller system memory 206 by indicating the amount of the microcode to be loaded from persistent memory 106. The next few bytes (hereinafter also referred to as "verification data") may be structured to verify that the boot process is valid. For example, the verification data may contain an expected value that when detected informs the boot controller 209 that the boot image being loaded into controller system memory 206 is likely correct. The actual order of the bytes may be varied in any way. It is advantageous if the verification bytes are loaded early to ensure that transceiver 100 completes the self-verification process before other microcode is loaded into controller system memory 206.

In response to detecting the verification data, the controller determines whether the verification data includes an expected value (act 303). The expected value may be stored in a register that the controller may access. The controller may compare the verification data with the expected value. If the expected value is included in the verification data, the boot image is likely correct and the controller will continue the boot process. If, on the other hand, the expected value is not included in the verification data, then the boot image is likely corrupted and the controller will retry the boot process a predetermined number of times. If the verification data does not have the expected value after retrying the boot process the predetermined number of times, the controller will enter a default operational state so that it becomes accessible to a host computing system for error analysis and other purposes.

Referring again to FIGS. 1 and 2, the boot controller 209 may determine whether the detected verification data includes an expected value. Boot controller 209 may access the expected value and compare the expected value with a value included in the verification data loaded from persistent memory 106.

If the boot controller 209 determines that the verification data contains the expected value, the boot controller 209 will continue with the boot process by continuing to load microcode from the persistent memory 106. The remaining microcode stored in persistent memory 106 may then be loaded into controller system memory 206.

If, on the other hand, boot controller 209 determines that the verification data does not contain the expected value, the boot controller 209 will retry the boot process a predetermined number of times. If the verification data does not have the expected value after retrying the boot process the predetermined number of times, the controller 209 will enter a default operational state For example, persistent memory 106 may not have been programmed with the appropriate microcode necessary to properly boot transceiver 100. There may also be other reasons why the boot image is incorrect such as corrupted data in persistent memory 106. The remaining microcode stored in persistent memory 106 will not be loaded into controller system memory 206. In some embodiments, boot controller 209 may initiate a warm reboot on determining that verification data does not have the expected value.

At a later time, persistent memory 106 may be programmed with the appropriate boot image. At that time, the boot process may be once again initiated by boot controller 209. Boot controller 209 would analyze the microcode being loaded into controller system memory 206 as described. However, this time the expected value may be detected and boot controller 209 would complete the boot process.

In another embodiment, the boot process is controlled by one of the processors 203. Processors 203 may initiate the boot process during either a cold or warm boot by sending directions to boot controller 209 or directly to persistent memory 106 to have microcode loaded into controller system memory 206.

Processors 203 may be configured to have access to a register or other storage source containing expected values for comparison with verification data that is loaded from persistent memory 106 into controller system memory 206. Boot controller 209 may write to another register the first few bytes of the verification data out of persistent memory 106. Processors 203 may then compare the written verification data to the expected value.

As in the previous embodiment, if processors 203 determine that the first few bytes of the verification data have the expected value, then processors 203 may determine that the boot image is valid. Processors 203 may direct that the boot process continue, causing persistent memory 106 to load its remaining microcode into controller system memory 206. If, on the other hand, the processors 203 did not detect the expected value, then processors 203 may determine that the boot image is not correct and may retry the boot process a predetermined number of times. If the verification data does not have the expected value after retrying the boot process the predetermined number of times, the processors 203 will enter a default operational state so that it becomes accessible to a host computing system for error analysis.

Accordingly, the principles of the present invention provide a method for the optical transceiver to self-validate the boot image loaded from the persistent memory early in the boot process. The early validation helps to prevent damage to optical transceiver components by corrupt microcode being loaded and executed by the transceiver. Accordingly, the principles of the present invention represent a significant advancement in the art of optical transceivers.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In an optical transceiver including an opto-electric receiver configured to receive a first optical data signal and convert the optical signal to a first electrical data signal, a post-amplifier configured to amplify the first electrical data signal, a driver configured to receive a second electrical data signal from an external host and provide a driving signal to an electro-optical transmitter, the electro-optical transmitter configured to emit light in response to the driving signal, a persistent memory configured to include boot microcode, the boot microcode including commands that initialize the optical transceiver during a boot process and verification data, a system memory configured to receive the boot microcode from the persistent memory during the boot process, and a controller configured to load information from the persistent memory to the system memory during the boot process, a method for validation of the persistent memory during the boot process, the method comprising:

initializing a boot process to begin loading boot microcode from the persistent memory to the system memory, the boot microcode including verification data;

detecting the verification data within the boot microcode loaded from the persistent memory to the system memory during the boot process initiation; and determining whether the verification data has an expected value.

2. A method in accordance with claim 1, wherein the determining step comprises the following:

determining that the verification data does have the expected value; and continuing the boot process in response to the determining that the verification data does have the expected value.

3. A method in accordance with claim 1, wherein the determining step comprises following:

determining that the verification data does not have the expected value;

repeating the boot process a predetermined number of times; and entering a default operational state if the verification data does not have the expected value after repeating the boot process for the predetermined number of times.

4. A method in accordance with claim 3, further comprising:

continuing the boot process if the verification data contains the expected value while repeating the boot process.

5. A method in accordance with claim 1, wherein the controller is a boot controller.

6. A method in accordance with claim 1, wherein the controller is a processor.

7. A method in accordance with claim 1, wherein the verification data is loaded from the persistent memory to the system memory and detected by the controller before booting the optical transceiver.

8. A method in accordance with claim 1, wherein the determining step comprises:
   comparing the verification data with the expected value.

9. A method in accordance with claim 1, wherein the boot process is a cold boot process.

10. A method in accordance with claim 1, wherein the boot process is a warm boot process.

* * * * *